(12) United States Patent
Yi et al.

(10) Patent No.: US 9,094,832 B2
(45) Date of Patent: *Jul. 28, 2015

(54) METHOD OF SELECTIVELY APPLYING A PDCP FUNCTION IN WIRELESS COMMUNICATION SYSTEM

(71) Applicant: LG ELECTRONICS INC., Seoul (KR)

(72) Inventors: Seung June Yi, Anyang-si (KR); Sung Duck Chun, Anyang-si (KR); Sung Hoon Jung, Anyang-si (KR); Young Dae Lee, Anyang-si (KR); Sung Jun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 177 days.

This patent is subject to a terminal disclaimer.

(21) Appl. No.: 13/870,908

(22) Filed: Apr. 25, 2013

(65) Prior Publication Data

US 2013/0235803 A1    Sep. 12, 2013

Related U.S. Application Data

(63) Continuation of application No. 13/019,241, filed on Feb. 1, 2011, now Pat. No. 8,483,090.

(60) Provisional application No. 61/300,800, filed on Feb. 2, 2010.

(51) Int. Cl.
   *H04W 28/06* (2009.01)
   *H04W 12/10* (2009.01)
   *H04W 80/02* (2009.01)
   *H04L 29/06* (2006.01)

(52) U.S. Cl.
   CPC ............. *H04W 12/10* (2013.01); *H04L 69/04* (2013.01); *H04W 28/06* (2013.01); *H04W 80/02* (2013.01)

(58) Field of Classification Search
   None
   See application file for complete search history.

(56) References Cited

U.S. PATENT DOCUMENTS

| 7,009,940 | B2 | 3/2006 | Vialen et al. |
| 8,014,307 | B2 | 9/2011 | Vialen et al. |
| 2002/0174332 | A1 | 11/2002 | Vialen et al. |
| 2003/0100291 | A1* | 5/2003 | Krishnarajah et al. ........ 455/410 |
| 2005/0033960 | A1 | 2/2005 | Vialen et al. |

(Continued)

FOREIGN PATENT DOCUMENTS

| CN | 1156196 | 6/2004 |
| EP | 1806943 | 7/2007 |

(Continued)

OTHER PUBLICATIONS

Ericsson, et al., "Discussion on Un radio protocol support for S1-AP", Tdoc R2-100430, 3GPP TSG-RAN WG2 #86bis, Jan. 2010, XP050421080, 3 pages.

(Continued)

*Primary Examiner* — Hicham Foud
(74) *Attorney, Agent, or Firm* — Lee, Hong, Degerman, Kang & Waimey

(57) ABSTRACT

Disclosed is a wireless communication system and terminal for providing a wireless communication service, and more particularly, a method of selectively applying a PDCP function based on data characteristic transmitted through a radio bearer in an Evolved Universal Mobile Telecommunications System (E-UMTS) evolved from a UMTS, Long Term Evolution (LTE) System or LTE-Advanced (LTE-A) system.

19 Claims, 11 Drawing Sheets

(a) Using 12 bits PDCP SN      (b) Using 7 bits PDCP SN

(56) References Cited

U.S. PATENT DOCUMENTS

| | | |
|---|---|---|
| 2007/0153793 A1 | 7/2007 | Jiang |
| 2007/0155339 A1 | 7/2007 | Jiang |
| 2008/0120728 A1 | 5/2008 | Jiang |
| 2008/0240439 A1 | 10/2008 | Mukherjee et al. |
| 2009/0025060 A1 | 1/2009 | Mukherjee et al. |
| 2009/0238129 A1 | 9/2009 | Park et al. |
| 2010/0054472 A1 | 3/2010 | Barany et al. |
| 2010/0118890 A1* | 5/2010 | Chun et al. .................... 370/469 |
| 2010/0202476 A1* | 8/2010 | Chun et al. .................... 370/477 |
| 2010/0246382 A1 | 9/2010 | Yi et al. |
| 2011/0002304 A1 | 1/2011 | Lee et al. |
| 2011/0053582 A1* | 3/2011 | Mueck et al. ................. 455/419 |
| 2011/0263221 A1 | 10/2011 | Yi et al. |
| 2011/0305339 A1 | 12/2011 | Norrman et al. |
| 2012/0182929 A1 | 7/2012 | Chen et al. |
| 2012/0201228 A1 | 8/2012 | Wu |
| 2012/0315878 A1 | 12/2012 | Deng |

FOREIGN PATENT DOCUMENTS

| | | |
|---|---|---|
| EP | 2136501 | 12/2009 |
| EP | 2485561 | 8/2012 |
| EP | 2523487 | 11/2012 |
| KR | 10-2009-0024937 | 3/2009 |
| KR | 1020090024937 | 3/2009 |
| KR | 1020090038752 | 4/2009 |

OTHER PUBLICATIONS

European Patent Office Application Serial No. 11740039.0, Search Report dated Dec. 18, 2013, 8 pages.

The State Intellectual Property Office of the People's Republic of China Application Serial No. 201180005583.1, Office Action dated Sep. 29, 2014, 9 pages.

* cited by examiner (a) Using 12 bits PDCP SN        (b) Using 7 bits PDCP SN

METHOD OF SELECTIVELY APPLYING A PDCP FUNCTION IN WIRELESS COMMUNICATION SYSTEM

CROSS-REFERENCE TO RELATED APPLICATIONS

This application is a continuation of U.S. patent application Ser. No. 13/019,241, filed on Feb. 1, 2011, now U.S. Pat. No. 8,483,090, which claims the benefit of earlier filing date and right of priority to Korean Patent Application No. 10-2011-0009783, filed on Jan. 31, 2011, and also claims the benefit of U.S. Provisional Application No. 61/300,800, filed on Feb. 2, 2010, the contents of which are all hereby incorporated by reference herein in their entireties.

TECHNICAL FIELD

The present invention relates to a wireless communication system and terminal for providing a wireless communication service, and more particularly, a method of selectively applying a PDCP function in an Evolved Universal Mobile Telecommunications System (E-UMTS) evolved from a UMTS, Long Term Evolution (LTE) System or LTE-Advanced (LTE-A) system.

BACKGROUND ART

The LTE system is a mobile communication system that has evolved from a UMTS system, and the standard has been established by 3rd Generation Partnership Project (3GPP), which is an international standardization organization.

FIG. 1 is a view illustrating the network architecture of an LTE system, which is a mobile communication system to which the related art and the present invention are applied.

As illustrated in FIG. 1, the LTE system architecture can be roughly classified into an Evolved UMTS Terrestrial Radio Access Network (E-UTRAN) and an Evolved Packet Core (EPC). The E-UTRAN may include a user equipment (UE) and an Evolved NodeB (eNB, base station), wherein the connection between UE-eNB is called a Uu interface, and the connection between eNB-eNB is called an X2 interface. The EPC may include a Mobility Management Entity (MME) performing a control-plane function and a Serving Gateway (S-GW) performing a user-plane function, wherein the connection between eNB-MME is called an S1-MME interface, and the connection between eNB-S-GW is called an S1-U interface, and both connections may be commonly called an S1 interface.

A radio interface protocol is defined in the Uu interface which is a radio section, wherein the radio interface protocol is horizontally comprised of a physical layer, a data link layer, a network layer, and vertically classified into a user plane (U-plane) for user data transmission and a control plane (C-plane) for signaling transfer. Such a radio interface protocol can be typically classified into L1 (first layer) including a PHY layer which is a physical layer, L2 (second layer) including MAC/RLC/PDCP layers, and L3 (third layer) including a RRC layer as illustrated in FIGS. 2 and 3. Those layers exist as a pair in the UE and E-UTRAN, thereby performing data transmission of the Uu interface.

FIGS. 2 and 3 are exemplary views illustrating the control plane and user plane architecture of a radio interface protocol between UE and E-UTRAN in an LTE system, which is a mobile communication system to which the related art and the present invention are applied.

The physical layer (PHY) which is a first layer provides information transfer services to the upper layers using a physical channel. The PHY layer is connected to the upper Medium Access Control (MAC) layer through a transport channel, and data between the MAC layer and the PHY layer is transferred through the transport channel. At this time, the transport channel is roughly divided into a dedicated transport channel and a common transport channel based on whether or not the channel is shared. Furthermore, data is transferred between different PHY layers, i.e., between PHY layers at the transmitter and receiver sides.

Various layers exist in the second layer. First, the Medium Access Control (MAC) layer serves to map various logical channels to various transport channels, and also performs a logical channel multiplexing for mapping several logical channels to one transport channel. The MAC layer is connected to an upper Radio Link Control (RLC) layer through a logical channel, and the logical channel is roughly divided into a control channel for transmitting control plane information and a traffic channel for transmitting user plane information according to the type of information to be transmitted.

The Radio Link Control (RLC) layer of the second layer manages segmentation and concatenation of data received from an upper layer to appropriately adjusts a data size such that a lower layer can send data to a radio section. Also, the RLC layer provides three operation modes such as a transparent mode (TM), an un-acknowledged mode (UM) and an acknowledged mode (AM) so as to guarantee various quality of services (QoS) required by each radio bearer (RB). In particular, AM RLC performs a retransmission function through an automatic repeat and request (ARQ) function for reliable data transmission.

A Packet Data Convergence Protocol (PDCP) layer of the second layer performs a header compression function for reducing the size of an IP packet header, which is relatively large in size and contains unnecessary control information to efficiently transmit IP packets, such as IPv4 or IPv6, over a radio section with a relatively small bandwidth. Due to this, information only required from the header portion of data is transmitted, thereby serving to increase the transmission efficiency of the radio section. In addition, in the LTE system, the PDCP layer performs a security function, which includes ciphering for preventing the third person's data wiretapping and integrity protection for preventing the third person's data manipulation.

A radio resource control (RRC) layer located at the uppermost portion of the third layer is only defined in the control plane. The RRC layer performs a role of controlling logical channels, transport channels and physical channels in relation to configuration, re-configuration, and release of Radio Bearers (RBs). Here, the RB denotes a logical path provided by the first and the second layers for transferring data between the UE and the UTRAN. In general, the establishment of the RB refers to a process of stipulating the characteristics of protocol layers and channels required for providing a specific service, and setting each of the detailed parameter and operation method thereof. The RB is divided into a signaling RB (SRB) and a data RB (DRB), wherein the SRB is used as a path for transmitting RRC messages in the C-plane while the DRB is used as a path for transmitting user data in the U-plane.

Hereinafter, a PDCP entity will be described in detail. The PDCP entity is upwardly connected to a RRC layer or user application, and downwardly connected to a RLC layer, and the detailed architecture thereof is as follows. FIG. 4 is an exemplary view illustrating the architecture of a PDCP entity.

The blocks illustrated in FIG. 4 are functional blocks, and may differ from actual implementation.

One PDCP entity may include a transmitter side and a receiver side as illustrated in FIG. 4. The transmitter side on the left performs a role of configuring SDU received from the upper layer or control information generated by the PDCP entity itself as PDU to transmit to a receiver side of the peer PDCP entity, and the receiver side on the right performs a role of extracting PDCP SDU or control information from the PDCP PDU received from a transmitter side of the peer PDCP entity.

As described above, there are two kinds of PDUs, data PDU and control PDU, which are generated by the transmitter side of the PDCP entity. First, PDCP Data PDU is a data block made in PDCP by processing SDU received from the upper layer, and PDCP Control PDU is a data block generated by PDCP itself for the PDCP to transfer control information to the peer entity.

The PDCP Data PDU is generated in RB of both the user plane and control plane, and some of the PDCP functions are selectively applied according to the used plane. In other words, a header compression function is applied only to U-plane data, and an integrity protection function within the security function is applied only to C-plane data. The security function may also include a ciphering function for maintaining the security of data in addition to the integrity protection function thereof, and the ciphering function is applied to both U-plane and C-plane data.

The PDCP Control PDU is generated only in U-plane RB, and may include roughly two types, such as a PDCP status report for informing a transmitter side of the situation of a PDCP reception buffer, and a header compression (HC) feedback packet for informing a header compressor of the situation of a header decompressor.

The data processing procedure performed by the PDCP layer of the transmitting side will be described as follows.

1. The PDCP layer of the transmitting side receives PDCP SDUs and stores the received PDCP SDUs in a transmission buffer. Then, the PDCP layer allocates a sequence number to each PDCP SDU.
2. If the established RB is that of the user plane, i.e., DRB, the PDCP layer performs header compression for the PDCP SDUs.
3. If the established RB is that of the control plane, i.e., SRB, the PDCP layer performs integrity protection for the PDCP SDUs.
4. A data block generated by the result of the procedure 2 or 3 is ciphered.
5. The PDCP layer fixes a proper header to the ciphered data block to constitute PDCP PDU, and then transfers the constituted PDCP PDU to the RLC layer.

The data processing procedure performed by the PDCP layer of the receiving side will be described as follows.

1. The PDCP layer of the receiving side removes a header from the received PDCP PDU.
2. The PDCP layer deciphers the PDCP PDU from which the header has been removed.
3. If the established RB is that of the user plane, i.e., DRB, the PDCP layer performs header decompression for the deciphered PDCP PDU.
4. If the established RB is that of the control plane, i.e., SRB, the PDCP layer performs integrity verification for the deciphered PDCP PDU.
5. A data block (i.e., PDCP SDU) generated by the result of the procedure 3 or 4 is transferred to the upper layer. If the established RB is that of the user plane, i.e., DRB, the PDCP layer stores the data block in a receiving buffer as occasion demands and performs reordering for the data block. Then, the PDCP layer transfers the resultant data to the upper layer.

Here, if the established RB is a DRB using a RLC AM (Acknowledged Mode), the reordering function should be performed. The reason for the performance of the reordering function is that the DRB using the RLC AM usually transmits error sensitive data traffic.

The security function has two kinds of functions, i.e., ciphering and integrity protection. A code varied depending on each packet is generated by these two functions, and ciphering and integrity check are performed for original data using the generated code.

The code varied depending on each packet is generated using a PDCP sequence number (SN) and added to each PDCP PDU header. For example, the code varied depending on each packet is generated using COUNT which includes PDCP SN. The COUNT has a length of 32 bits, of which the least significant bit (LSB) has a PDCP SN and the most significant bit (MSB) has a hyper frame number (HFN). The PDCP SN has a length of 5 bits, 7 bits, or 12 bits depending on a radio bearer (RB). Accordingly, the HFN has a length of 27 bits, 25 bits or 20 bits.

FIG. 5 is a diagram illustrating an example of a method of performing ciphering in a PDCP layer. A PDCP layer of a transmitting side generates ciphered data by covering original data with a MASK. The MASK is a code varied for each of the aforementioned packets. Covering original data with a MASK means that XOR operation for each bit is performed for the original data with respect to MASK. A PDCP layer of a receiving side, which has received the ciphered data, deciphers the original data by again covering the original data with a MASK. The MASK has 32 bits and is generated from several input parameters. In particular, in order to generate different values for respective packets, COUNT is generated using PDCP SN varied depending on PDCP PDU. The COUNT is used as one of MASK generation input parameters. In addition to the COUNT, examples of the MASK generation input parameters include ID value (bearer of FIG. 5) of a corresponding RB, Direction having an uplink or downlink value, and a ciphering key (CK) exchanged between a user equipment and a network during RB establishment.

FIG. 6 is a diagram illustrating an example of a method of performing integrity protection in a PDCP layer. Similarly to the aforementioned ciphering procedure, in an integrity protection procedure, parameters, such as COUNT based on PDCP SN, bearer which is ID value of RB, Direction having an uplink or downlink value, and integrity protection key (IK) exchanged between a user equipment and a network during RB establishment, are used. A specific code, i.e., MAC-I (Message Authentication Code-Integrity) is generated using the above parameters. The integrity protection procedure is different from the aforementioned ciphering procedure in that the generated MAC-I is added to PDCP PDU not undergoing XOR operation with original data. The PDCP layer of the receiving side, which has received the MAC-I, generates XMAC-I using the same input parameter as that used in the PDCP layer of the transmitting side. Afterwards, XMAC-I is compared with MAC-I, and if two values are equal to each other, it is determined that the data have integrity. If not so, it is determined that the data have been changed.

Hereinafter, a Long-Term Evolution Advanced (LTE-A) system will be described. The LTE-A system is a system that has been developed from an LTE system to meet IMT-Advanced conditions, which are the fourth generation mobile communication conditions recommended by the International Telecommunication Union-Radiocommunication Sector (ITU-R). At present, the LTE-A system standard is actively under development by 3GPP that has developed the LTE system standard. Representative technologies newly added in the LTE-A system mi carrier aggregation technology for extending a used bandwidth to be flexibly used, and relay technology for increasing coverage, supporting group mobility, and allowing network arrangement.

Here, relay is a technology for relaying data between a user equipment (EU) and an Evolved Node B (eNB, base station). Since communication is not smoothly implemented in case where a distance between UE and eNB is far in the LTE system, it is introduced in an LTE-A system as a method of making up for the problem. A new network node, which is referred to as Relay Node (RN), is introduced between UE and eNB to perform such a relay operation, wherein the eNB for managing RN is called Donor eNB (DeNB). In addition, an interface between RN-DeNB that has been newly added due to RN is defined as an Un interface, thereby being differentiated from a Un interface that is an interface between UE and a network node. FIG. 7 illustrates such a concept of Relay Node and an Un interface.

Here, the RN serves to manage UE in behalf of the DeNB. In other words, from a standpoint of the UE, the RN is shown as DeNB, and therefore, MAC/RLC/PDCP/RRC, which is an Uu interface protocol that has been used in a conventional LTE system, is used as they are in a Uu interface between UE-RN.

From a standpoint of the DeNB, the RN may be shown as UE or shown also as eNB according to circumstances. In other words, when the RN is first accessed to the DeNB, it is accessed through random access like UE because the existence of the RN is unknown to the DeNB, but operated like eNB managing UE connected to itself after the RN is once accessed to the DeNB. Accordingly, along with the Uu interface protocol, the functions of the Un interface protocol should be also defined as in the form to which a network protocol function is also added. For the Un interface protocol, discussions as to which functions should be added or changed to each protocol layer on the basis of Uu protocols such as MAC/RLC/PDCP/RRC are still in progress in 3GPP.

The Un radio protocol and the Uu radio protocol have no difference each other, as the RN operates just like the UE. Here, the network protocol may be divided into a S1 protocol and a X2 protocol. Usually, the RN supports the S1 protocol for communicating with MME or S-GW in the UN interface, and supports the X2 protocol for communicating with other eNBs.

DISCLOSURE

Technical Problem

In general, both U-plane data and C-plane data are transmitted through DRB in UN interface. Namely, since the control data (e.g., S1-AP (or X2-AP) message) is transmitted through the DRB, a PDCP function (e.g., integrity protection) can not be applied to control message (i.e., C-plane data). However, if the PDCP function is applied to all DRB in the Un interface, 4 byte of MAC-I must be added for each PDU, thereby increasing a transmission overhead. Further, if the PDCP function is applied to all DRB in the Un interface, an unnecessary PDCP function, such as reordering function, can be performed for the control data that does not requires for the in-order delivery, thereby causing a transmission delay.

Technical Solution

Therefore, an object of the present invention is to provide a method for selectively applying a PDCP function, such as a integrity protection, when DeNB (Doner eNB) establishes a DRB (Data RB) in an UN interface.

To achieve the object of the present invention in accordance with one embodiment, there is provided a method of applying an operation of integrity protection in wireless communication system, the method comprising: receiving a configuration message from a network, wherein the configuration message includes an indicator for indicating whether the operation of integrity protection should be performed; and selectively performing the operation of the integrity protection according to the indicator included in the configuration message.

Also, to achieve the object of the present invention in accordance with one embodiment, there is provided a method of applying an operation of integrity protection in wireless communication system, the method comprising: transmitting a configuration message to a wireless transmitting and receiving unit (WTRU); wherein the configuration message includes an indicator for indicating whether the operation of integrity protection should be performed; and selectively performing the operation of the integrity protection according to the indicator included in the configuration message.

MODE FOR INVENTION

One aspect of this disclosure relates to the recognition by the present inventors about the problems of the related art as described above, and further explained hereafter. Based upon this recognition, the features of this disclosure have been developed.

The present invention is applied to 3GPP communication technologies, especially, to communication apparatuses and methods in UMTS system, UTE system or UTE-A system. However, the present invention may not be limited to this communication type, but applicable to any wired/wireless communication complying with the scope of the present invention.

Hereinafter, description will be given of the configurations and operations of the preferred embodiment according to the present invention with reference to the accompanying drawings.

Figure 1:
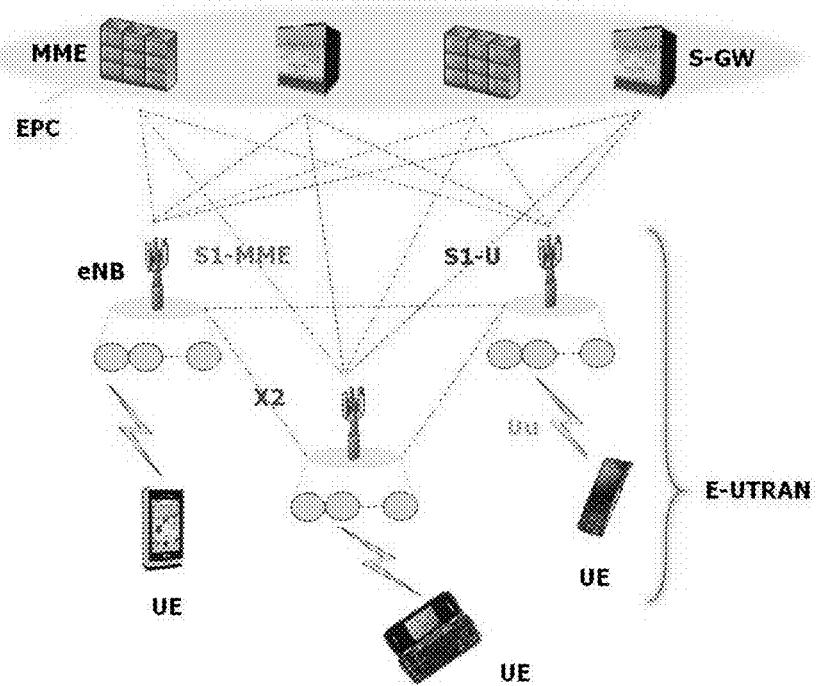
FIG. 1 is a view illustrating the network architecture of an LTE system or an LTE-A system, which is a mobile communication system to which the related art and the present invention are applied.
Figure 2:
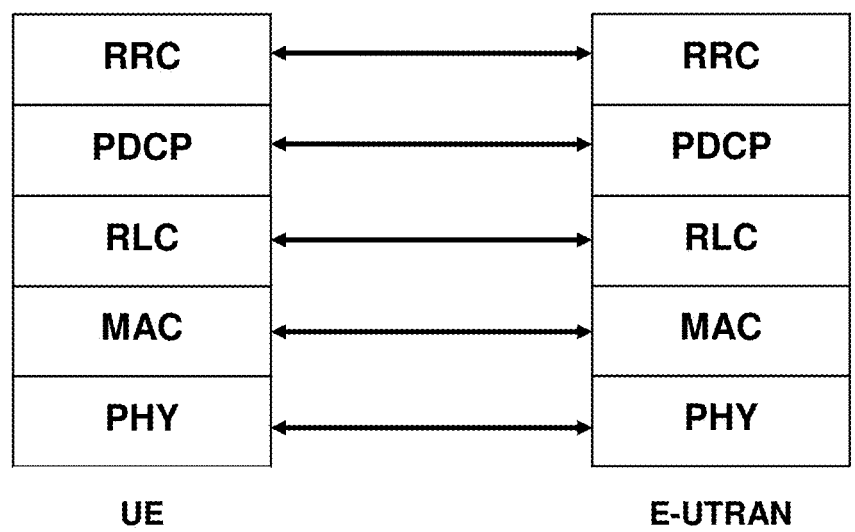
FIG. 2 is an exemplary view illustrating the control plane architecture of a radio interface protocol between UE and E-UTRAN in an LTE system or an LTE-A system, which is a mobile communication system to which the related art and the present invention are applied.
Figure 3:
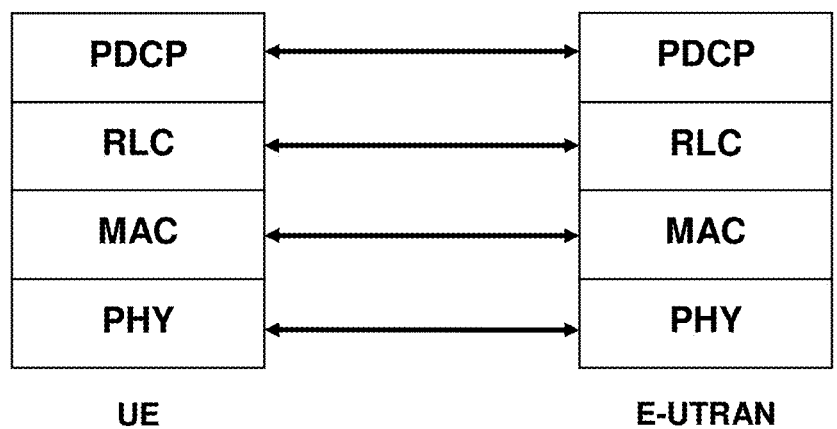
FIG. 3 is an exemplary view illustrating the user plane architecture of a radio interface protocol between UE and E-UTRAN in an LTE system or an LTE-A system, which is a mobile communication system to which the related art and the present invention are applied.
Figure 4:
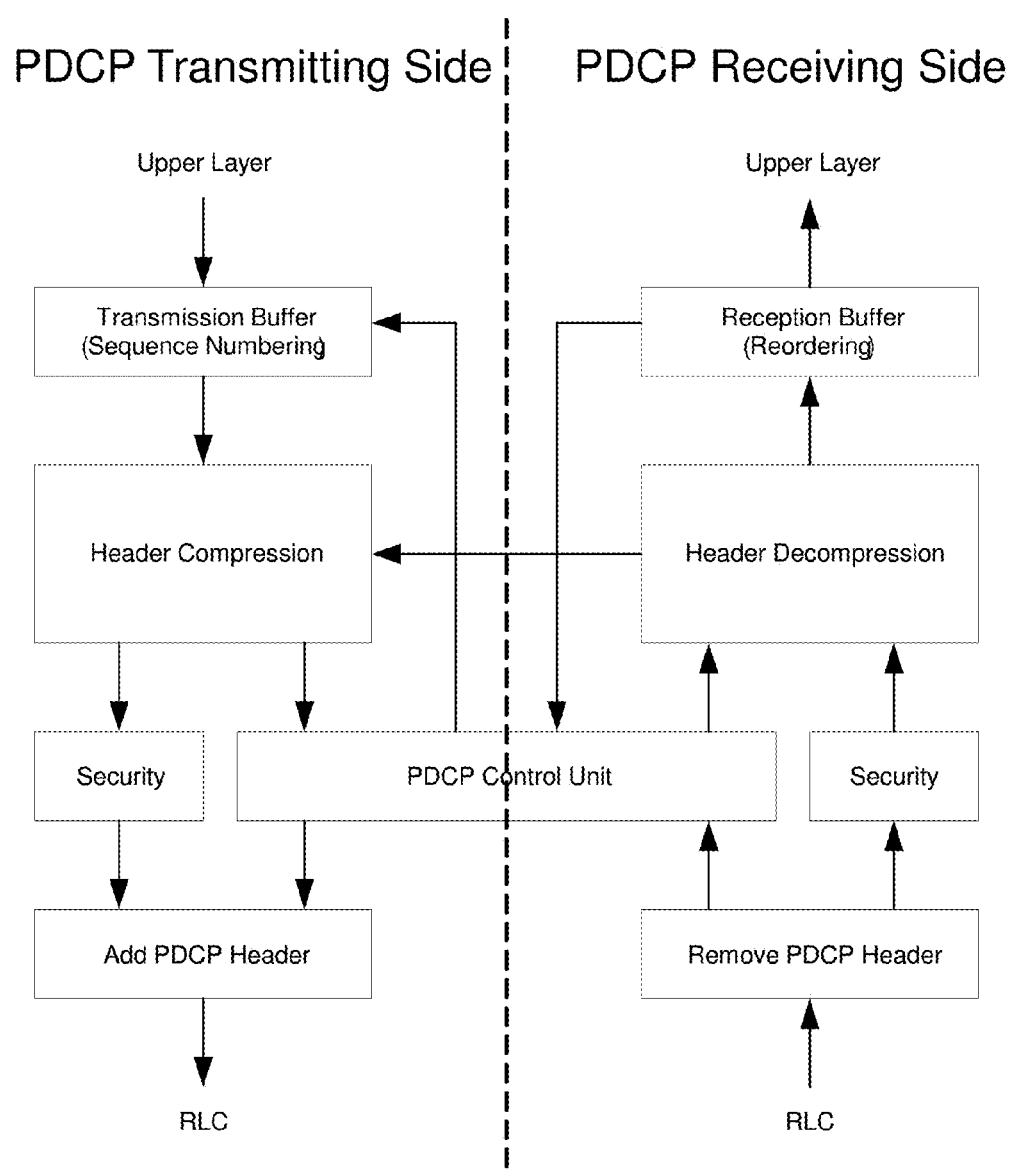
FIG. 4 is a diagram illustrating a functional structure of a PDCP layer.
Figure 5:
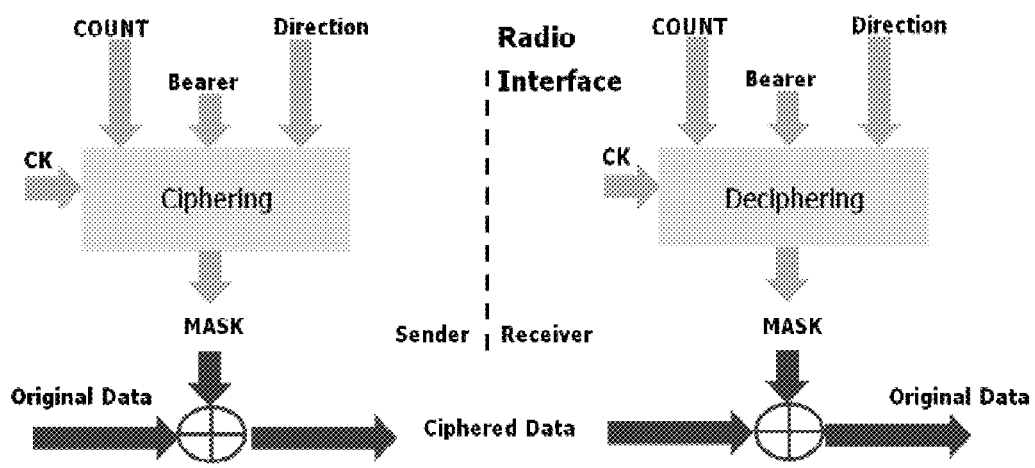
FIG. 5 is a diagram illustrating an example of a method of applying a ciphering function of security functions performed in a PDCP layer to a packet.
Figure 6:
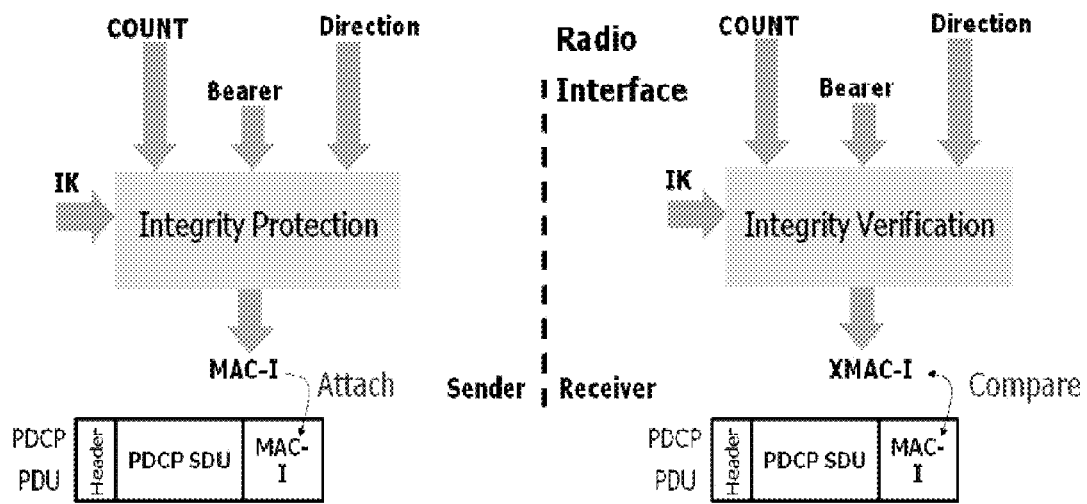
FIG. 6 is a diagram illustrating an example of a method of applying an integrity function of security functions performed in a PDCP layer to a packet.
Figure 7:
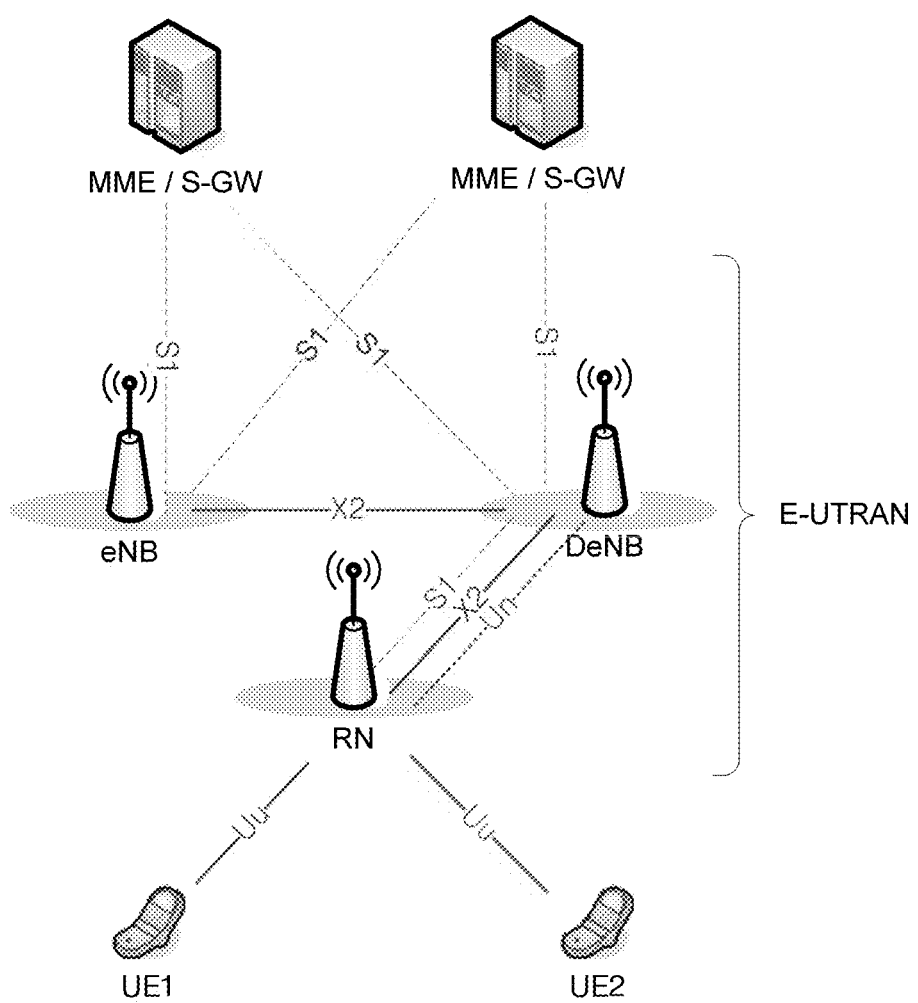
FIG. 7 is a diagram illustrating a concept of Relay Node and an Un interface.
Figure 8:
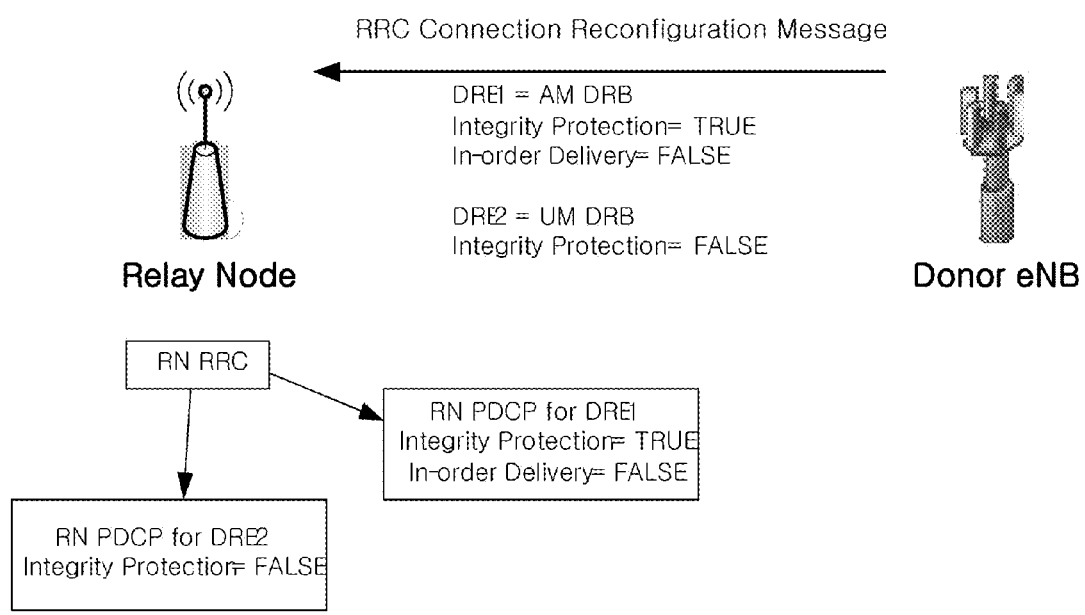
FIG. 8 is an exemplary view illustrating a procedure for selectively applying a PDCP function using a PDCP function indicator in accordance with the present invention.

FIG. 8 is an exemplary view illustrating a procedure for selectively applying a PDCP function using a PDCP function indicator in accordance with the present invention.

As illustrated in FIG. 8, when a Donor eNB (DeNB) adds or changes a DRB (Data RB) to a relay node (RN), by using of an indicator, the DeNB may notify the RN that which PDCP function should be applied. Here, the PDCP function may be a integrity protection and/or an in-order deliver. Further, some of the PDCP function may not be selectively applied by using the indicator. For example, if the in-order delivery function is set to be applied for all DRB, then the indicator may be utilized only to indicate whether the integrity protection should be performed or not. Alternatively, the in-order delivery function may be selectively applied only for the AM DRB and the integrity protection function may be selectively applied for both AM DRB and UM DRB. Further, the PDCP function may be selectively applied with respect to the DRB (Data RB) only. That is, the above PDCP function indictor may be not provided to the SRB (Signaling RB). Here, the above PDCP function indicator may be expressed as a 1 bit. For example, with respect to the each PDCP function, the PDCP function indicator may be represented as 'True/False', 'Enable/Disable', 'Support/No support'', etc. Here, the PDCP function indicator may be included in a RRC (Radio Resource Control) message, which used to add or change the DRB. Such RRC message may be a RRC connection setup message, RRC connection reconfiguration message, or a RRC connection re-establishment message, etc. here, the RRC message may be used to add or change a plurality of DRB. If the plurality of DRB is added or changed, the indicator may be configured for each of the plurality of DRB independently.

When the RN receives the RRC message from the DeNB, by checking the indicator included in the received RRC message, the RN may determine that which PDCP function (i.e., integrity protection, in-order delivery, etc) should be performed for each DRB. Then, the RN may configure a PDCP entity with applying of a corresponding PDCP function. For example, if the RN receives the RRC message having indictor of 'integrity protection=True' and 'in-order deliver=False', the RRC of RN may configure the PDCP to apply the integrity protection only.

Figure 9:
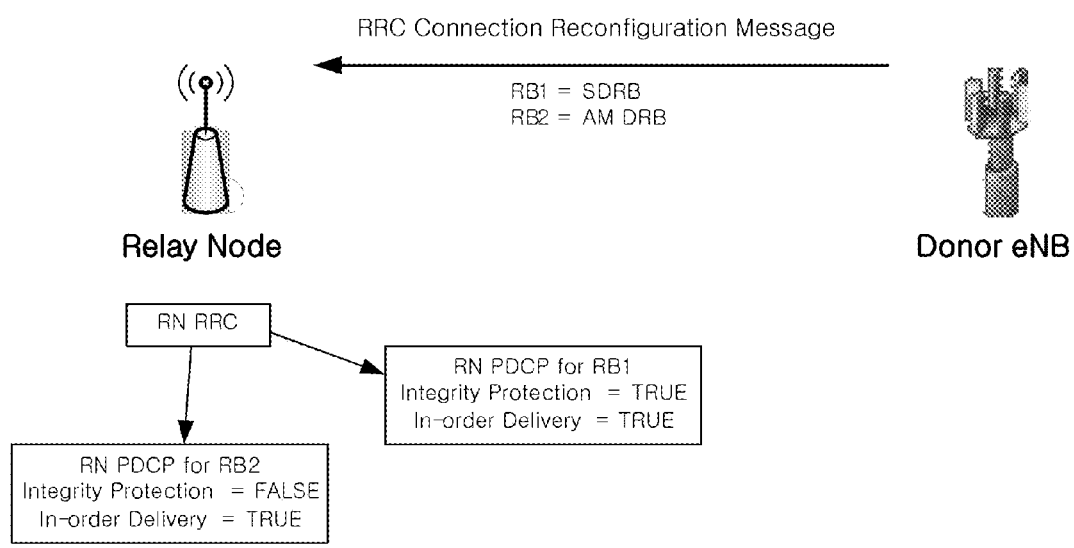
FIG. 9 is an exemplary view illustrating a procedure for selectively applying a PDCP function using a radio bearer type indicator in accordance with the present invention.

FIG. 9 is an exemplary view illustrating a procedure for selectively applying a PDCP function using a radio bearer type indicator in accordance with the present invention.

As illustrated in FIG. 9, a new type of RB (Radio Bearer) can be used for a transmission of control message (e.g., S1-AP, X2-AP). That is, other than the conventional SRB or DRB, the new type of RB (e.g., signaling data RB; SDRB) may be defined such that the PDCP function (e.g., integrity protection, in-order deliver, etc) is applied to this new type of RB. When the new type of RB (i.e., SDRB) is defined, the RRC message may be transmitted through a signaling RB (SRB) and the user data may be transmitted through a AM DRB or a UM DRB. That is, the S1-AP or X2-AP message may be only transmitted using the new type of RB (SDRB).

As illustrated in FIG. 9, when the DeNB adds or changes a RB to the RN, the DeNB may notify a type of the RB to the RN. That is, with respect to each RB, a RB type indicator may be used to indicate the type of the each RB. (i.e., SRB, AM DRB, UM DRB, SDRB, etc) Here, the RB type indicator may be included in a RRC message. Further, the RB type indicator may be utilized only for a DRB transmitting a user data. For example, beside the SRB transmitting a RRC message, the RB type indicator may be used for a corresponding DRB to indicate whether the corresponding DRB is a DRB or a SDRB. In this case, the RB type indicator may be referred as a DRB type indicator.

When the RN receives the RRC message from the DeNB, by checking the RB type indicator included in the received RRC message, the RN may determine the type of RB for each RB. Then, the RN may configure a PDCP entity based on the type of RB. For example, if the RN receives the RRC message having RB type indictor of 'RB type indicator=SDRB', the RRC of RN may configure the PDCP to apply the integrity protection and the in-order delivery.

Figure 10:
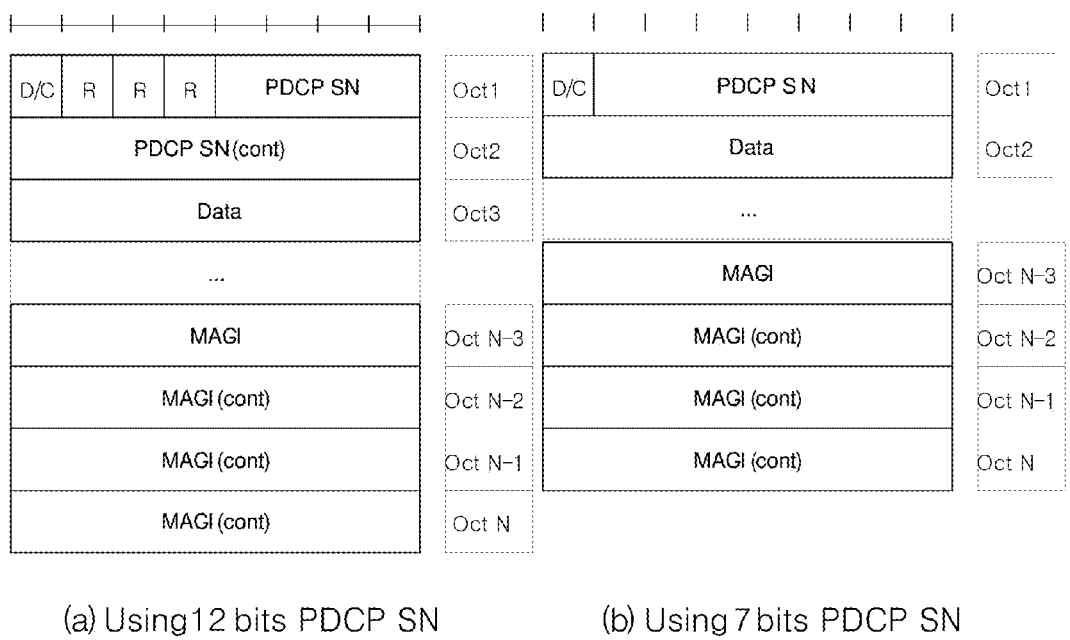
FIG. 10 is an exemplary view illustrating a PDCP data PDU format of integrity protection applied DRB in accordance with a first embodiment of the present invention.

FIG. 10 is an exemplary view illustrating a PDCP data PDU format of integrity protection applied DRB in accordance with a first embodiment of the present invention.

As illustrated in FIG. 10, if an integrity protection is applied to a particular DRB, a MAC-I (Message Authentication Code-Integrity) code may be inserted in a PDCP data PDU (Protocol Data Unit). Here, the MAC-I code may be inserted in last portion of the PDCP data PDU. Accordingly, a transmitting side PDCP may transmit the MAC-I code by inserting it to last portion of the PDCP data PDU. Thereafter, after receiving the PDCP data PDU, a receiving side PDCP may decode a PDCP SDU (Service Data Unit) by removing the MAC-I code. The MAC-I code may have a length of 4 byte or may have various length size depending on an integrity algorithm. The transmitting side PDCP may generate two different type of PDU, such as a data PDU and a control PDU. Here, the integrity protection function may be only applied to the data PDU. That is, the MAC-I may be inserted in last portion of the PDCP data PDU. If the receiving side PDCP receives an integrity protection applied PDCP PDU, the receiving side PDCP may check a D/C field of header of the PDCP PDU in order to determine an existence of the MAC-I. For example, if the D/C field indicates that the received PDCP PDU is a PDCP data PDU, last 4 byte of the received PDCP PDU should be considered as the MAC-I code. However, if the D/C field indicates that the received PDCP PDU is a PDCP control PDU, the MAC-I code may not exist in the received PDCP PDU.

Figure 11:
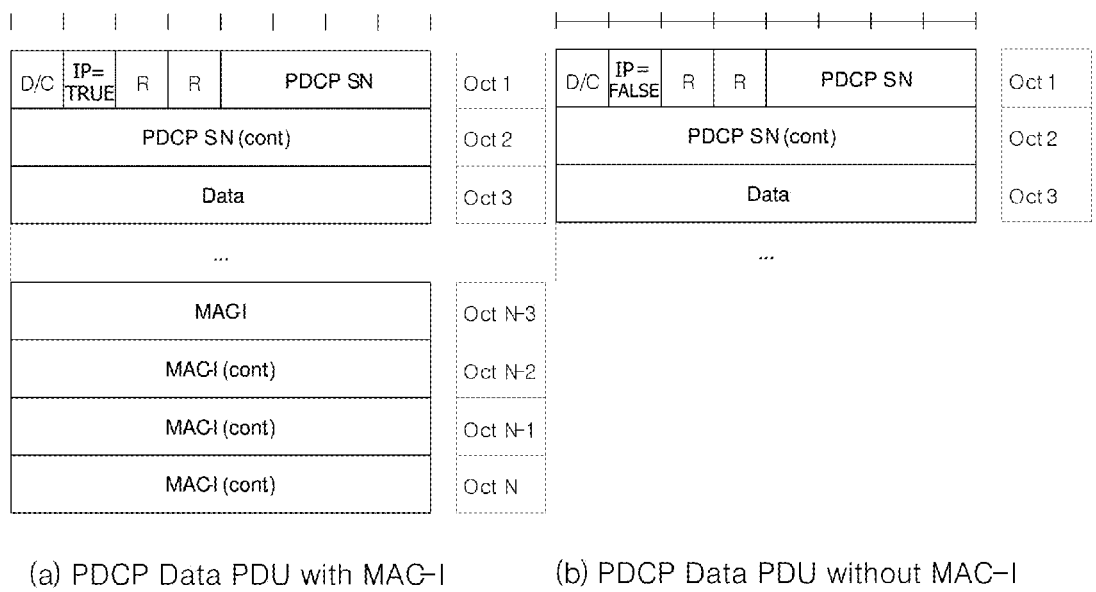
FIG. 11 is an exemplary view illustrating a PDCP data PDU format in accordance with a second embodiment of the present invention.

FIG. 11 is an exemplary view illustrating a PDCP data PDU format in accordance with a second embodiment of the present invention.

In general, a plurality of Uu RB may be mapped into a single Un RB. Here, the plurality of Uu RB has same or similar quality of service (QoS). In this case, an integrity protection may be applied or may not be applied to the PDCP data PDU transmitted through the Un RB. If the integrity protection is independently applied to each of the PDCP PDU, an integrity protection indicator may be added or inserted to indicate whether or not the integrity protection is applied for each PDCP PDU. For example, if the integrity protection indicator is set to a 'True' for a corresponding PDU, the receiving side PDCP may apply the integrity protection for the corresponding PDU. However, if the integrity protection indicator is set to a 'False' for a corresponding PDU, the receiving side PDCP may process without performing of the integrity protection.

According to the present invention, the applicability of PDCP functions, such as an integrity protection, a header Compression, and an in-order delivery and duplicate detection, may be indicated when a DRB (Data RB) is established in an Un interface. Here, the applicability of a ciphering function may not need to be indicated because the ciphering function is always applied. At a time of the DRB establishment in Un interface, the DeNB may indicate 1) whether the integrity protection is applied, 2) whether the header compression is applied, and 3) whether the in-order delivery and duplicate detection is applied, to the RN (Relay Node) for each DRB. The applicability of these functions may be indicated in a RRC (Radio Resource Control) message (e.g. a DRB Establishment message) by an indicator. The applicability information may be transmitted from the RN to the DeNB before the DRB establishment if the DeNB does not have any information of the DRB. When the RN receives a DRB establishment message from the DeNB, the RN may check whether the integrity protection, the header compression, or the in-order delivery and duplicate detection is applied to the DRB.

If the DRB establishment message indicates that the integrity protection is applied to the DRB, then a RRC of RN may configure the PDCP to support the integrity protection. Otherwise, the RRC of RN may configure the PDCP without the integrity protection. Likewise, if the DRB establishment message indicates that the header compression is applied to the DRB, then the RRC of RN may configure the PDCP to support the header compression. Otherwise, the RRC of RN may configure the PDCP without the header compression. Further, If the DRB establishment message indicates that the in-order delivery and duplicate detection is applied to the DRB, then the RRC of RN may configure the PDCP to support the in-order delivery and duplicate detection. Otherwise, the RRC of RN may configure the PDCP without the in-order delivery and duplicate detection.

For S1-MME-DRB, the integrity protection may be applied, but the in-order delivery and duplicate detection may be not applied. The header compression may or may not be applied. According to the present invention, a new type of DRB, may be referred to a SDRB, can be defined to support the characteristic of S1-MME-DRB. The S1-U-DRB is a conventional DRB, and has such characteristics as; the integrity protection is not applied, the header compression is applied, and the in-order delivery and duplicate detection is applied. To differentiate from SDRB, the conventional DRB (i.e. S1-U-DRB) may be called as UDRB. If the DRB is classified into two types, i.e. SDRB and UDRB, then simpler way to establish a DRB in Un interface may be to include a DRB type indicator in the DRB establishment message.

When the RN receives a DRB establishment message from the DeNB, the RN may check the type of the DRB by the DRB type indicator, and may establish the DRB complying with the characteristics of DRB type. The characteristics of UDRB and SDRB may be defined, for example, as the following Table 1. Note that it is possible to define the DRB characteristics differently, e.g. Header Compression is applied to SDRB.

TABLE 1

|  | DRB Type = UDRB | DRB Type = SDRB |
|---|---|---|
| Ciphering | TRUE | TRUE |
| Integrity Protection | FALSE | TRUE |
| Header Compression | TRUE | FALSE |
| In order Delivery and Duplicate Detection | TRUE | FALSE |

If the DRB is configured so that the integrity protection is applied, the PDCP transmitter may attach MAC-I (Message Authentication Code-Integrity) at the end of each PDCP Data PDU, and the PDCP receiver may detach MAC-I that are attached at the end of the PDCP Data PDU when it receives a PDCP Data PDU. Here, the MAC-I may be not attached to PDCP Control PDUs. For example, due to the integrity protection, 4 bytes MAC-I field may be attached at the end of the PDU. Here, the MAC-I field is attached only when the D/C field indicates the PDU is Data PDU.

In general, the applicability of integrity protection is more important than other functions because the PDCP Data PDU format depends on it (i.e. whether the MAC-I field is attached or not). In addition, it is possible that integrity protection is applied per PDU basis rather than per DRB basis. Therefore, the integrity protection indicator may be added in the PDCP header to indicate whether the corresponding PDU is integrity protected or not (i.e. whether the MAC-I field is attached or not). This kind of integrity protection indicator is very useful for DRBs in Un interface where multiplexing of UDRBs and SDRBs is possible if they have similar QoS (Quality of Service) characteristics. In this case, applying integrity protection per PDU may be required.

In LTE, the PDCP may serves three types of radio bearer; SRB, AM DRB (DRB mapped on RLC AM), and UM DRB (DRB mapped on RLC UM). The PDCP functions may be applied differently depending on the type of RB. To send S1-AP messages in Un interface, one of RB type may be utilized. Then, which type of RB is suitable for S1-AP transmission should be discussed. The PDCP functions required for each type of RB including SDRB, may be defined, for example as the following Table 2.

TABLE 2

|  | SRB | AM DRB | UM DRB | SDRB |
|---|---|---|---|---|
| Ciphering | Applied | Applied | Applied | Applied |
| Integrity Protection | Applied | Not applied | Not applied | Applied |
| Header Compression | Not applied | Applied | Applied | FFS |
| Reordering | Not applied | Applied | Not applied | Not applied |
| Unconfirmed SDU at Re-establishment | Discard | Retransmission | N/A | Discard (AM) N/A (UM) |
| Untransmitted SDU at Re-establishment | Discard | Transmission | Transmission | Discard |

TABLE 2-continued

|  | SRB | AM DRB | UM DRB | SDRB |
|---|---|---|---|---|
| PDU received from RLC re-establishment | Discard | Process | Process | Discard |
| State variables at Re-establishment | Reset | Continue | Reset | Reset |

As can be seen from the table 2, there are many differences between DRB and SDRB. In addition, the DRB may be not suitable for S1-AP transmission in Un interface. As the SRB has much commonality with the SDRB, the SRB may be more suitable for S1-AP transmission. Therefore, according to the present invention, the S1-AP message may be transmitted on SRB in Un interface. Further, according to the present invention, a new type of SRB-like RB (e.g. SDRB) is defined for S1-AP transmission.

The present invention may provide a method of applying an operation of integrity protection in wireless communication system, the method comprising: receiving a configuration message from a network, wherein the configuration message includes an indicator for indicating whether the operation of integrity protection should be performed; selectively performing the operation of the integrity protection according to the indicator included in the configuration message; receiving a data unit through a specific radio bearer that is enabled to perform the operation of the integrity protection; and transmitting a data unit through a specific radio bearer that is enabled to perform the operation of the integrity protection, wherein the configuration message is used to configure a radio bearer, the indicator included in the configuration message is transmitted from the network per each radio bearer, the received data unit includes a code related to the integrity protection, the data unit is a Packet Data Convergence Protocol (PDCP) Protocol Data Unit (PDU), the transmitted data unit includes a code related to the integrity protection, the specific radio bearer is a Data Radio Bearer (DRB), and the configuration message is a Radio Resource Control (RRC) connection reconfiguration message.

It can be also said that the present invention may provide a method of applying an operation of integrity protection in wireless communication system, the method comprising: transmitting a configuration message to a wireless transmitting and receiving unit (WTRU); wherein the configuration message includes an indicator for indicating whether the operation of integrity protection should be performed; and selectively performing the operation of the integrity protection according to the indicator included in the configuration message, wherein the configuration message is used to configure a radio bearer, the indicator included in the configuration message is transmitted per each radio bearer, and the configuration message is a Radio Resource Control (RRC) connection reconfiguration message.

The present invention may further provide an apparatus for applying an operation of integrity protection in wireless communication system, the apparatus comprising: a transceiver to transmit or receive a data; a memory to store the data: and a processor cooperating with the transceiver and memory to perform the steps of: receiving a configuration message from a network, wherein the configuration message includes an indicator for indicating whether the operation of integrity protection should be performed; and selectively performing the operation of the integrity protection according to the indicator included in the configuration message.

The present invention provides a method of selectively applying a PDCP function (e.g., an integrity protection) according to a data characteristic transmitted through a radio bearer between a base station (e.g., DeNB) and a relay node (RN) such that an unnecessary data transmission can be minimized and a data transmission overhead can be reduced.

Hereinafter, a terminal in accordance with the present invention will be described.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of applying an integrity protection in wireless communication system, the method comprising:
receiving, by a Relay Node (RN), a configuration message from a network,
wherein the configuration message includes an indicator for indicating whether the integrity protection should be used by the Relay Node (RN); and
using, by the Relay Node (RN), the integrity protection according to the indicator included in the configuration message,
wherein when the integrity protection is used, a format of a data unit for a Relay Node Data Radio Bearer (RN DRB) includes a D/C (Data/Control) field, one or more reserved fields, one or more fields for a sequence number of the data unit, one or more data fields, and one or more fields for information related to the integrity protection.

2. The method of claim 1, wherein the one or more fields for information related to the integrity protection carries a message authentication code.

3. The method of claim 2, wherein the message authentication code is a MAC-I (Message Authentication Code-Integrity).

4. The method of claim 1, wherein the one or more fields for information related to the integrity protection are attached at end of the data unit.

5. The method of claim 1, wherein the one or more fields for information related to the integrity protection is only attached when the D/C field indicates that the data unit is a data PDU.

6. The method of claim 1, wherein the data unit is a PDCP (Packet Data Convergence Protocol) PDU (Protocol Data Unit).

7. The method of claim 1, wherein the D/C field is used to indicate whether the data unit is a control PDU or a data PDU.

8. The method of claim 1, wherein the indicator included in the configuration message is received by the RN per each DRB (Data Radio Bearer).

9. The method of claim 1, wherein the one or more data fields includes data from each DRB mapped on a RLC AM (Radio Link Control Acknowledged Mode) or a RLC UM (Radio Link Control Unacknowledged Mode).

10. A method of applying an integrity protection in wireless communication system, the method comprising:
transmitting a configuration message to a Relay Node (RN);
wherein the configuration message includes an indicator for indicating whether the integrity protection should be used by the Relay Node (RN),
wherein the integrity protection is used by the RN according to the indicator included in the configuration message, and
wherein, when the integrity protection is used, a format of a data unit for a Relay Node Data Radio Bearer (RN DRB) includes a D/C (Data/Control) field, one or more reserved fields, one or more fields for a sequence number of the data unit, one or more data fields, and one or more fields for information related to the integrity protection.

11. The method of claim 10, wherein the one or more fields for information related to the integrity protection carries a message authentication code.

12. The method of claim 11, wherein the message authentication code is a MAC-I (Message Authentication Code-Integrity).

13. The method of claim 10, wherein the one or more fields for information related to the integrity protection are attached at end of the data unit.

14. The method of claim 10, wherein the one or more fields for information related to the integrity protection is only attached when the D/C field indicates that the data unit is a data PDU.

15. The method of claim 10, wherein the data unit is a PDCP (Packet Data Convergence Protocol) PDU (Protocol Data Unit).

16. The method of claim 10, wherein the D/C field is used to indicate whether the data unit is a control PDU or a data PDU.

17. The method of claim 10, wherein the indicator included in the configuration message is received by the RN per each DRB (Data Radio Bearer).

18. The method of claim 10, wherein the one or more data fields includes data from each DRB mapped on a RLC AM (Radio Link Control Acknowledged Mode) or a RLC UM (Radio Link Control Unacknowledged Mode).

19. A Relay Node (RN) for applying an integrity protection in wireless communication system, the Relay Node (RN) comprising:
a transceiver to transmit or receive a data;
a memory to store the data: and
a processor cooperating with the transceiver and memory to perform the steps of:
receiving a configuration message from a network,
wherein the configuration message includes an indicator for indicating whether the integrity protection should be used by the Relay Node (RN), and
using the integrity protection according to the indicator included in the configuration message,
wherein, when the integrity protection is used, a format of a data unit for a Relay Node Data Radio Bearer (RN DRB) includes a D/C (Data/Control) field, one or more reserved fields, one or more fields for a sequence number of the data unit, one or more data fields, and one or more fields for information related to the integrity protection.

* * * * *